United States Patent [19]

Shinagawa

[11] Patent Number: 5,126,541
[45] Date of Patent: Jun. 30, 1992

[54] INTEGRATED CIRCUIT CARD

[75] Inventor: Toru Shinagawa, Toride, Japan

[73] Assignee: Hitachi Maxell, Ltd., Osaka, Japan

[21] Appl. No.: 396,675

[22] Filed: Aug. 22, 1989

[30] Foreign Application Priority Data

Aug. 26, 1988 [JP] Japan .................................. 63-212065

[51] Int. Cl.⁵ .............................................. G06K 7/00
[52] U.S. Cl. .................................... 235/438; 235/441; 235/493
[58] Field of Search ............... 235/379, 380, 441, 492, 235/438

[56] References Cited

U.S. PATENT DOCUMENTS

4,939,353 7/1990 Iijima ............................ 235/492 X

*Primary Examiner*—David Trafton
*Attorney, Agent, or Firm*—Birch, Stewart, Kolasch & Birch

[57] ABSTRACT

An IC card including a processor, a first memory for storing therein a system program which runs on the processor and which is associated with a basic operation of the IC card, a second memory for storing therein an application program which runs on the processor and which corresponds to a usage of the IC card, a third memory for storing therein data processed by the processor, an input/output unit for effecting input and output operations of programs and data, a program stop section for stopping the program being executed on the processor at a specified address and a data output section for supplying the input/output unit with either one of a content of a register in the processor and a content of an area at an address of at least one of the first, second, and third memories when the program running on the processor is stopped.

13 Claims, 6 Drawing Sheets

PROGRAM STOP SECTION 6
IMPLEMENTED BY HARDWARE

FIG. 7

PROGRAM STOP SECTION
IMPLEMENTED BY SOFTWARE

INTEGRATED CIRCUIT CARD

BACKGROUND OF THE INVENTION

1. Field of the Invention

The present invention relates to an Integrated Circuit (IC) card, and in particular, to an IC card in which an operation program loaded therein can be easily debugged.

2. Discussion of the Related Art

IC cards are employed as cards of various financial facilities and those of identification of workers or employees. Moreover, the IC cards have been increasingly used as cash cards of banks, credit cards for various transactions, and cards for purchasing tickets and the like of traffic facilities.

These cards have been put to use in various areas of applications. IC cards issued in association with various transactions contain of data to be processed depending on the respective transactions, and processing techniques of the data vary between the cards. For these reasons, the processing programs of such cards are prepared to correspond to terminals or host computers (the host computers and terminals are collectively referred to as terminals hereafter) on which the processing programs are to be respectively executed. The processing program includes a control program (to be referred to as a basic processing program) for controlling basic operations such as data read/write operations, and communications; furthermore, a processing program (to be referred to as an application program in this specification) for assigning particular functions depending on the specifications of the IC card after the card is manufactured. In this situation, an IC card, of a so-called down-load processing type has been proposed to be put to practice in which in association with terminals corresponding to the various transactions, the application programs are respectively written later therein. In the IC card of the down-load processing type, an application program corresponding to the specification of the IC card is written after the manufacturing thereof. In this operation, the application program to be loaded into the IC card is ordinarily developed by use of a personal computer or the like in many cases.

The application program created, depending on the purpose and processing functions of the IC card, is required to be debugged through an operation test as the IC card for a confirmation of the operation. When the operation test and debugging are achieved on the developed application program, an operation test program and a debug program necessary therefor are usually loaded on the side of the personal computer. The operation test is interactively conducted according to the programs in such a manner that data is externally supplied to the IC card loaded with the prepared application program so as to check the response to the supplied data.

The interactive operation above is achieved in association with the respective function items of the IC card in such a manner that upon receiving response data from the IC card, the personal computer or the like judges the content of the test and that the debugging of the application program is accomplished by executing the application program loaded in the personal computer. In consequence, the debugging of the application program in the card requires a large number of operational steps and hence the program development efficiency is lowered. Moreover, in the program development, developing tools are necessary in correspondence with the application program to be the development object, which requirement complicate the configuration of the development system and makes the program development cost soar.

In addition, since appropriate data is to be supplied to the personal computer in order to achieve the operation test and the program debugging, the content of the basic processing program loaded in the IC card is required to be known. Consequently, when the program is developed by an external program firm other than the basic processing program developer, information as to the content of the basic processing program in the IC card is required to be supplied to the external program firm. This leads to a disadvantage that the security of the basic control program cannot be preserved.

SUMMARY OF THE INVENTION

It is, therefore, an object of the present invention to provide an IC card having a high development efficiency for developing an application program to be loaded in an IC card, thereby solving the problems above.

Another object of the present invention is to provide an IC card facilitating an operation test and a debugging of an application program to be executed in the IC card.

Still another object of the present invention is to provide an IC card improved for developing an application program to run in an IC card by a small-scale development system not having a debugging function.

Another object of the present invention is to provide an IC card in which only a portion of an application program down-loaded in an IC card is executed to supply a result of the execution to a terminal connected to the IC card, thereby evaluating the portion of the application program.

In order to achieve the objects above, the IC card according to the present invention includes a processor, a first nonvolatile memory section storing therein a basic processing program which runs on the processor to conduct a communication and a memory control, a second nonvolatile memory section which is a rewritable memory for storing therein through a down-load operation an application program to be written depending on a the purpose of the card after the card is manufactured, a third memory section comprising a rewritable nonvolatile or volatile memory for storing therein various processing data items, a program initiate processing means for causing the processor to execute an application program (communicating data between the card and an external device) beginning from an execution start address set in the second nonvolatile memory section, a program stop processing means for stopping an execution of the application program when a stop condition set during the execution of the application program is satisfied, and data output processing means for outputting to an external device a content of at least one selected from registers in the processor, other registers, an area indicated by a specified address of the second non-volatile memory unit, and an area indicated by a specified address of the third memory unit such that at least one of the execution start address and the stop condition and data output is set by use of an external device.

As described above, since the IC card is provided with a program initiate processing means for executing from an arbitrary address an application a program loaded from an external device into the IC card, program stop processing means for stopping the application program during an execution thereof when an arbitrary stop condition, such as one associated with a stop address, is satisfied, and data output processing means for effecting processing to output information from the memory units, the registers, and the like of the IC card to an external device, after a developed application program is stored in the IC card, the application program can be partially executed so as to output a result of the execution to the external device.

As a result, the operation test of the IC card and the debugging of the developed application program are facilitated. The operation of the developed program to be the development object is identical to the operation to be conducted in the actual operation environment. In consequence, the IC card is suitable for the development of the application program thereof in a small-scale developing system not having a debugging function.

BRIEF DESCRIPTION OF THE DRAWINGS

These and other objects and advantages of the present invention will become apparent by reference to the following description and accompanying drawings wherein.

DETAILED DESCRIPTION OF THE INVENTION

Figure 1:
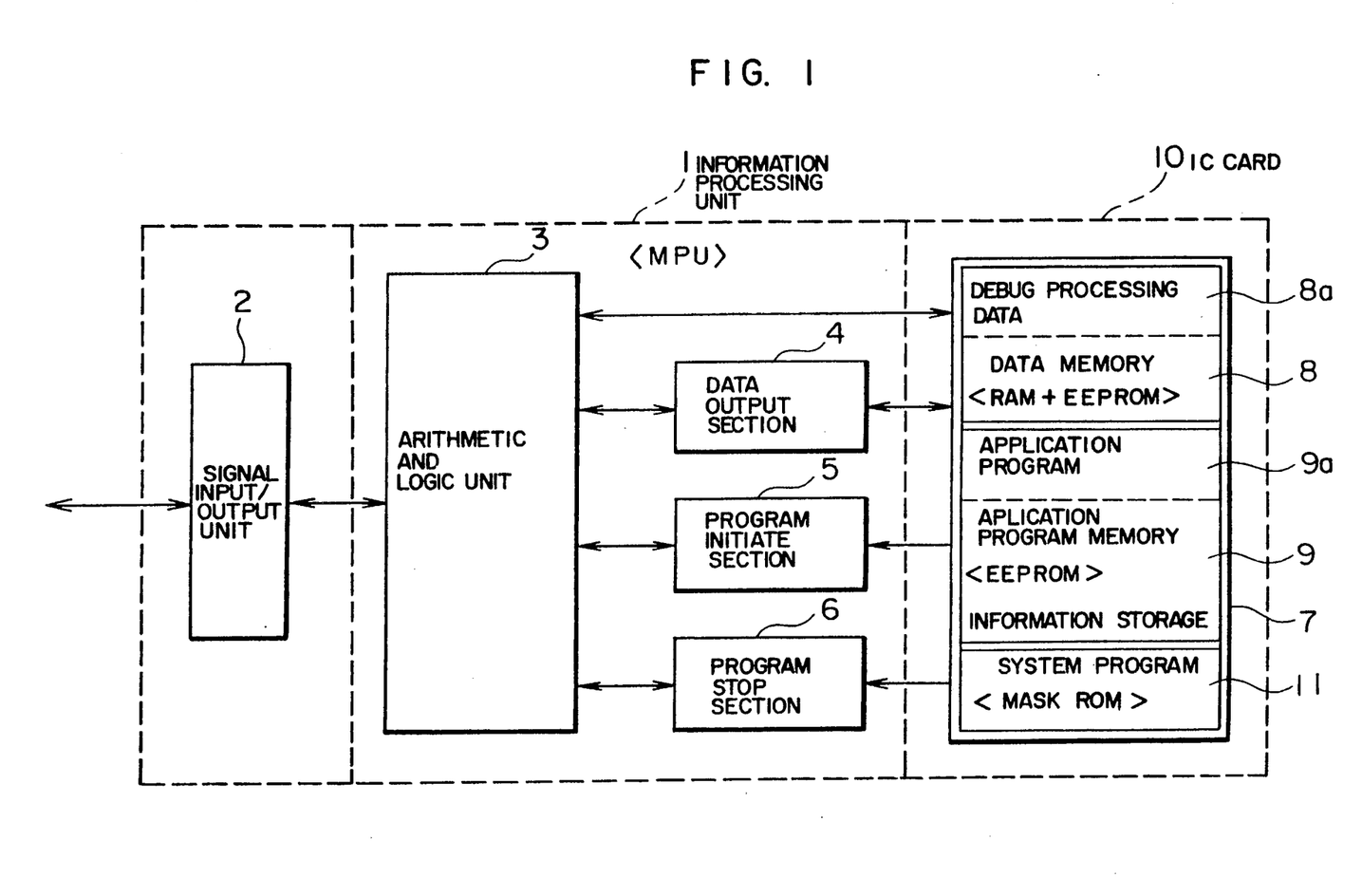
FIG. 1 is a block diagram schematically showing an embodiment to which an IC card is applied according to the present invention.

The configuration of FIG. 1 includes an IC card 10 which is installed in an IC card reader/writer or the like to communicate data with it and an information processing unit 1, including (a microprocessor (MPU). The system further includes a signal input/output unit 2 of the IC card 10. The MPU communicates data with the terminal via the signal input/output unit 2.

When manufacturing an IC card, the system program or the basic processing program is desirably stored in a mask read-only memory (ROM). When the IC card is issued, information items such as a secret code or a password of a card user and areas to be set in the memory depending on the purpose of the IC card are downloaded or stored in the ROM together with the application program developed, depending on the utilization purpose. The information items may further include a key of the issuer, an account number of a banking card of the user, and attribute information items such as a name and an address of the card user. The application program thus stored in the ROM is subjected to an operation test through an actual usage of the IC card, thereby achieving the debugging.

In an ordinary operation of the IC card 10 after the issuance thereof, the MPU of the information processing unit 1 executes a predetermined processing in accordance with an application program 9a stored in the operation program memory section 9. In a random access memory (RAM) area of a data memory section 8 comprising an RAM and an electrically erasable programmable ROM (EEPROM), data transferred from the terminal, read data, resultant data, and the like are temporarily stored. These data items are transferred between the IC card and the terminal having the IC card reader/writer or the like. Incidentally, the EEPROM region of the data memory section 8 is ordinarily loaded with registration data, such as history information of shopping and banking transactions conducted by use of the IC card.

The operation program of the IC card 10 is transferred through a down loading from the terminal so as to be stored as the application program 9a in the operation program memory section 9 comprising an EEPROM or the like in the information storage or memory 7. As a result, the IC card 10 is provided with the functions such that the MPU 1 operates according to the program and the IC card 10 executes processing in association with the purposes and specifications thereof.

The MPU of the information processing unit 1 has functional blocks including an arithmetic and logic unit 3, a data output section 4, a program initiation processing section 5, and a program stop processing section 6. Incidentally, a portion of or all of these constituent elements may be implemented as hardware in the form of a circuit or may be realized by executing by means of the MPU, the basic processing program associated therewith and stored in a system program memory unit 11 or the like comprising a mask ROM in the information storage 7 (or in the MPU of the information processing unit 1). Furthermore, these functional blocks may be made operational by use of a combination of hardware and software.

Under the conditions above, the arithmetic and logic unit 3 selectively executes several basic programs stored in the system program memory section 11 and the application program 9a so as to achieve the various processing specified. The basic processing programs include a program write program to write data (application program) supplied from an external device for the application program 9a in an area of the operation program memory section 9, a debug processing data write program or debugger program to load in a debug processing data area 8a of the data memory 8 with debug processing data including information to specify an initiating position or an execution start address of the application program 9a and/or an initiating condition, information specifying a register or the like associated with read data, and information specifying a stop position or a stop address of the application program 9a and/or a stop condition, supplied from an external device and a mode switch program to change over the IC card 10 between an ordinary operation mode and a development mode. These programs are stored in the system program memory 11.

Figure 4:
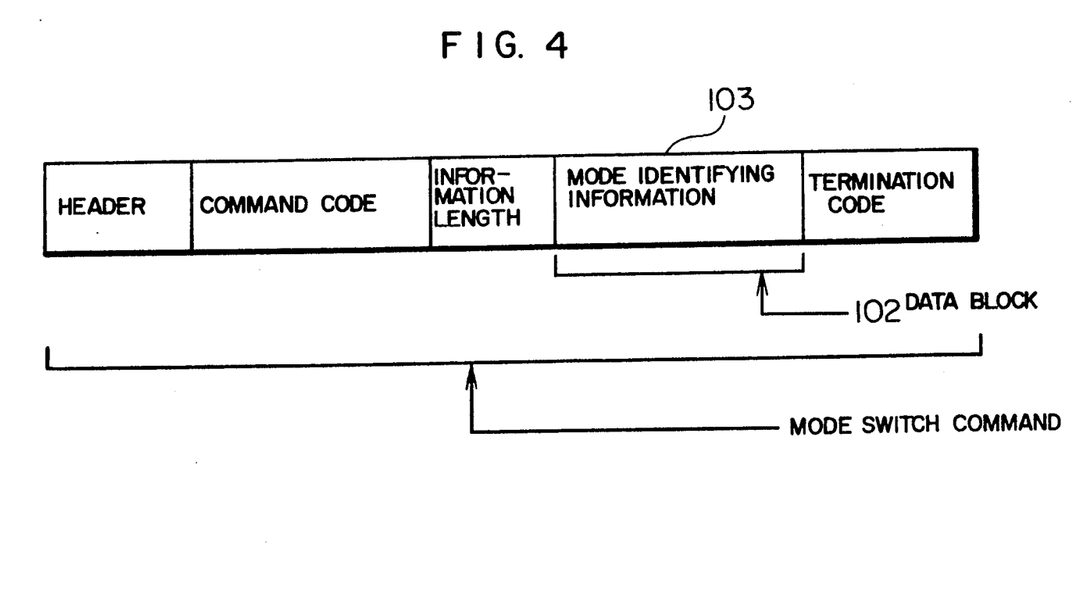
FIG. 4 is a schematic diagram showing a format of a mode switch command.
Figure 5:
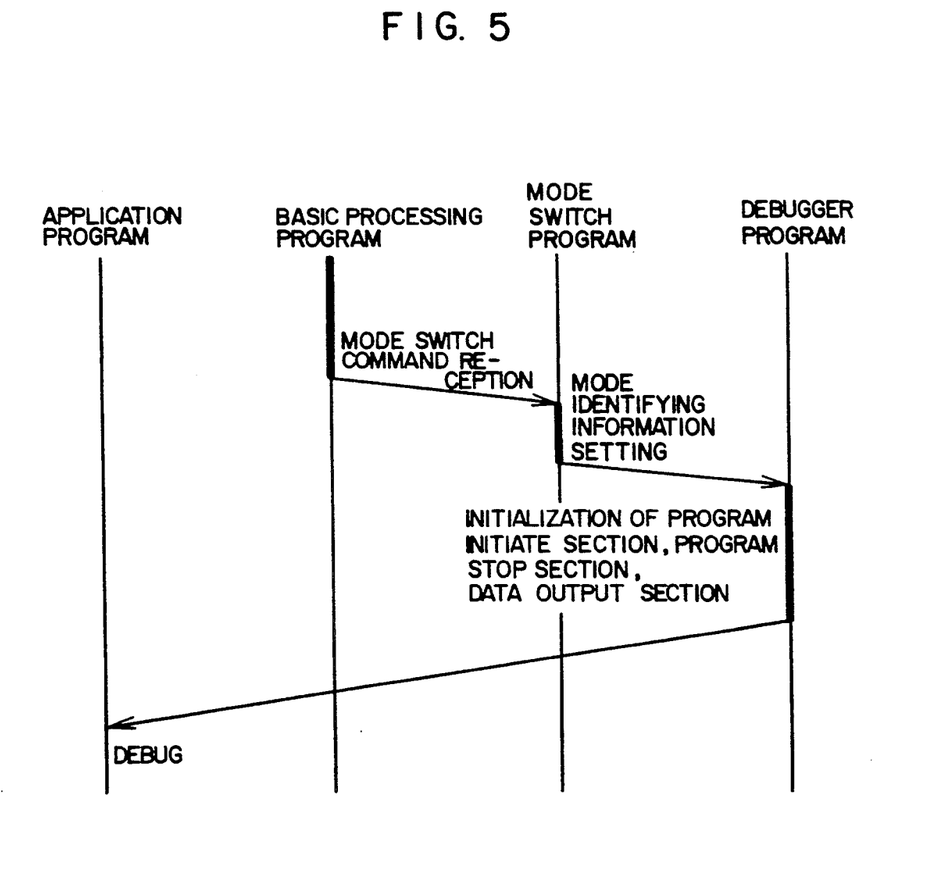
FIG. 5 is a diagram showing a mode switch sequence.

Referring to FIGS. 4 and 5, a description will be given of a method of changing over the mode. As shown in FIG. 5, the system program 11 includes a basic processing program, a debugger program, and a mode switch program. Communications with an external device are conducted by the basic processing program. On receiving a mode switch command via the signal input/output unit 2, the basic processing program orders to store the received command in the RAM region of the data memory 8 and then jump to the mode switch program. The command includes a data block 102 in which a mode identifying information item of a switch objective mode (the ordinary or development mode) is set. The mode switch program orders to store the mode identifying information in the EEPROM region of the data memory 8. In a case where the EEPROM is used for this purpose, even when the power is turned off, the previous state is preserved, which is effective in a program developing phase. In contrast, the mode identifying information may be stored in the RAM region of the data memory 8. In this case, when the power is turned off, the mode information item is initialized by the reset operation. When the content of the specified mode identifying information indicates the development mode, the mode switch program initiates the debugger program (FIG. 5) stored in the system program memory 11. The debugger program sets to the data memory 8 address information items and the like to be respectively used in the data output section 4, the program initiate section 5, and the program stop section 6 and then initiates these sections. When these components are implemented by hardware units, the initiation of the operations are achieved by generating operation enable signals for the respective units. If these components are softwarewise realized, the system achieves initialization of the components.

Each of the programs above is selected for initiation when the MPU of the information processing unit 1 decodes a command supplied from the external device so as to be executed by the arithmetic and logic unit 3. When the mode switch program is selected to be executed, as indicated by an arrow 33 of FIG. 3, the operation of the IC card 10 is changed over from the ordinary operation mode 31 to the development operation mode 32 or vice versa. When the IC card 10 is set to the development mode, the data output section 4, the program initiate section 5, and the program stop section 6 of FIG. 1 are respectively initiated to the operative state. On the other hand, in the ordinary operation mode, these sections 4-6 are in the stopped state, and the arithmetic and logic unit 3 sets up the basic processing program and the application program 9a to the executable state. Incidentally, when a mode change-over is to be achieved in response to a signal from an external device, as already described in conjunction with FIG. 4, the mode switch program is started by use of a command code with mode identifying information loaded in the data block 103.

In the ordinary processing mode, when the command from the external device is a write command of the application program 9a, a so-called down loading is achieved in response thereto so as to execute the program write program to store the data of the application program 9a in the operation program memory 9. If the command indicates a write command of the debug processing data, the debug processing data write program loads the debug processing data storage area 8a of the data memory 8 with the debug processing data sent from the external device.

Incidentally, the application program 9a is to be developed, before the IC card 10 is issued, depending on the utilization purpose thereof. In the development of the program 9a, a personal computer or the like is used to generate the program 9a. At the issuance of the IC card 10, the program 9a is written in the IC card 10 according to the program write program and then the operation of the program is confirmed. In the initial stage of the development, since the prepared application program usually includes wrong portions, the program is required to be debugged. On the other hand, the basic processing program stored in the system program memory 11 is generally written as a basic control program or a system program in the IC card when the card is manufactured.

Assume here that the IC card 10 has already been loaded with the various basic processing programs in the system program memory 11, that the data output section 4, the program initiate section 5, and the program stop section 6 are ready to start and to stop the application program 9a at an arbitrary address according to the debug processing data, and that the debug processing data is freely set from the external device. In consequence, the operation test and the debug of the application program 9a are executable in a state associated with the actual operation of the IC card 10 corresponding to specified portions of the program 9a. Next, a procedure of the debug will be described. First, an application program under development is downloaded by the program write program initiated in response to a command supplied from an external device such as a terminal, thereby writing the program 9a in the operation program memory 9 of the IC card 10. Thereafter, the debug processing data write program is initiated by use of a command from the external device so as to write the debug processing data in the debug processing data storage area 8a of the data memory 8. The mode switch program is then started by use of the external device to change over the IC card 10 from the ordinary operation mode to the development mode.

As a result of the mode change-over operation, the data output section 4, the program initiate section 5, and the program stop section 6 are respectively initiated. The program initiate section 5 references a start address stored in the debug processing data storage area 8a to instruct the arithmetic and logic unit 3 to start execution from a start address specified in a jump instruction supplied from the external device, thereby initiating the application program 9a from the start address.

On the other hand, the program stop section 6 starts its operation after the application program 9a is initiated to monitor stop information stored in the debug processing data storage area 8a and address data, control data, and other data transmitted onto a bus of the MPU. On sensing a matching condition of a stop condition, the program stop section 6 causes the arithmetic and logic unit 3 to interrupt the application program 9a being executed.

Figure 6:
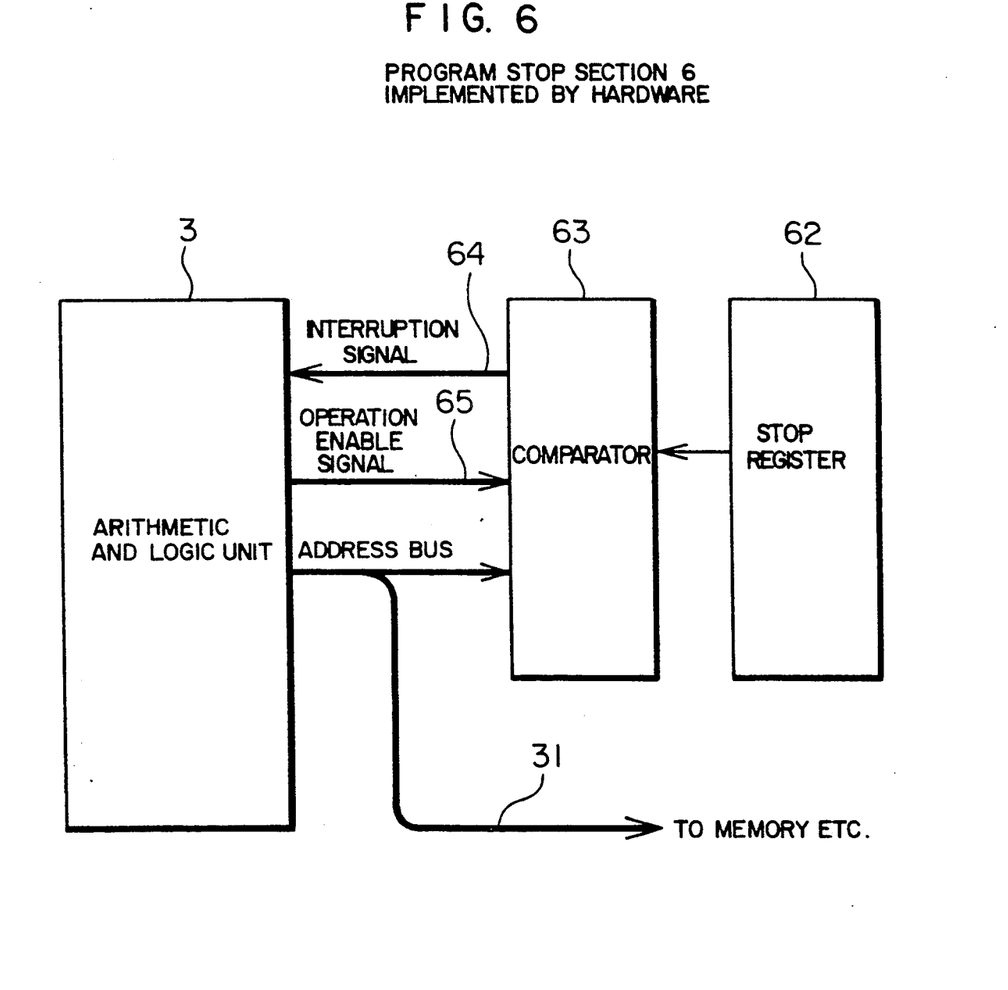
FIGS. 6 and 7 are diagrams showing respective configurations of the program stop processing section.
Figure 7:
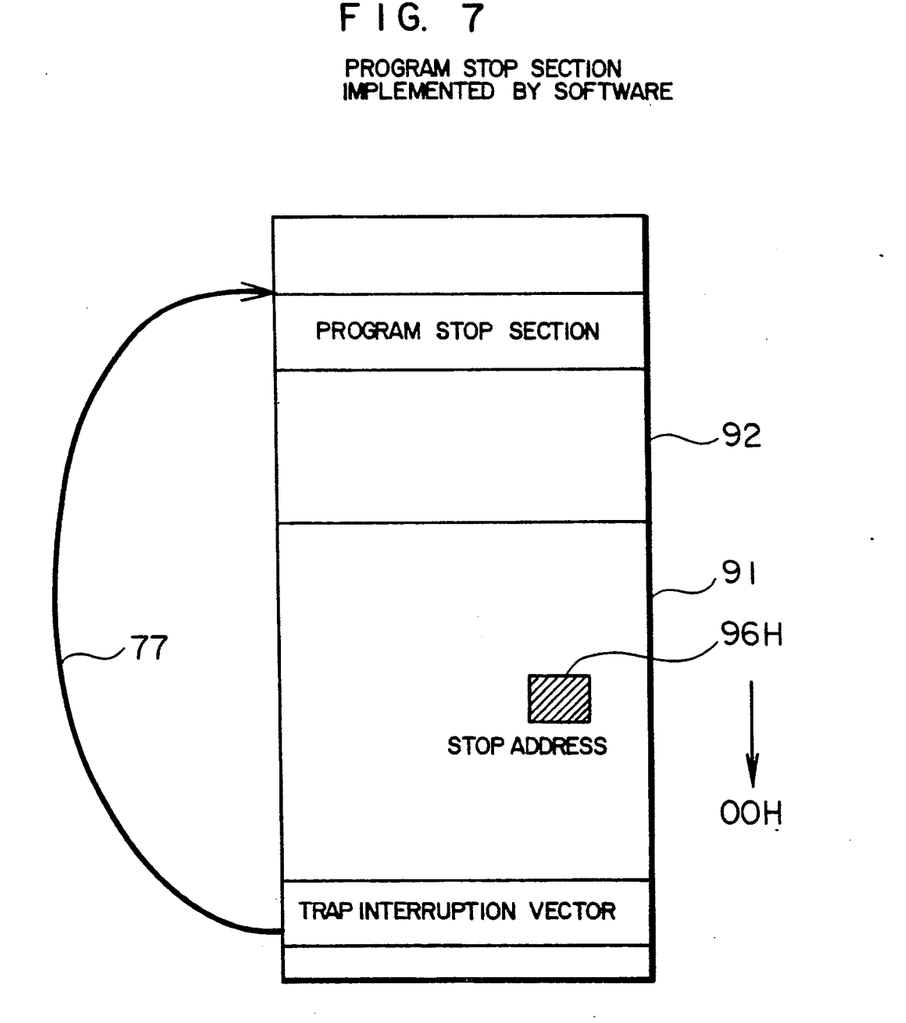

Referring now to FIGS. 6 and 7, a description will be given of a method of interrupting the program execution. FIGS. 6 and 7 show examples in which the program stop section 5 is implemented by use of hardware and software, respectively. In the program stop unit 6 of FIG. 6, a stop address set by the debugger program is stored in a stop register 62, and a comparator 63 is connected to an address bus 31 to compare memory address information processed by the arithmetic and logic unit 3 with a value of the stop register 62. In addition, the comparator 63 is initialized by the debugger program such that an operation enable signal 65 is supplied to the comparator 63, which is accordingly set to the operable rotate. When the application program 9a is started and an address on the address bus 31 is identical to the address set to the stop register 62, an interruption signal 64 is generated to interrupt the processing of the application program 9a so as to pass control to the program stop section 6 indicated by the interruption processing vector. In this manner, the operation of the application program 9a may be stopped by use of the program stop section 6 implemented by the hardware.

Next, a description will be given in FIG. 7 of an example in which the program stop section 6 is made operational by use of software. The program stop section 6 temporarily saves a program code (for example, 96H) of a stop address set at the initialization so as to thereafter replace the stop address program code with a code (for example, 00H) which cannot be executed by the arithmetic and logic unit 3. After the application program 9a is initiated by the program initiate section 5, when an attempt is made to execute the program code at the stop address in the application program 9a, a trap error occurs (because an attempt is made to execute an unexecutable program code). As a result of the trap error, an internal interruption takes place, which causes control to jump to an address stored in the trap interruption vector as indicated by the arrow 77. The address stored in the trap interruption vector is set beforehand to the first address of the program stop section 6 or an address where the processing is to be executed after the stoppage of the application program 9a. After the application program 9a is interrupted, when the program stop section 6 starts its operation, the stop address program code saved in advance is restored (to 96H). In this manner, the execution of the application program 9a can be stopped.

The data output section 4 traces, depending on specifying information such as register with regard to read data, information items or the like stored in a specified internal memory and register, and at a specified address in the information memory 7 or changes of the information items so as to sequentially store the trace data or data such as in the internal memory and the register in the predetermined storage areas of the data memory 8. When the execution of the application program 9a is stopped, the data output section 4 causes the arithmetic and logic unit 3 to read from the data memory unit 8 information items stored in the specified internal memory, the register, and at the specified address of the information storage 7 or trace information associated wit the address. The data output unit 4 conducts a control to transmit the information as response information from the IC card 10 to the external device via the arithmetic logic unit 3 and the signal input/output unit 2.

Incidentally, output timing from the data output section 4 of the trace information and the contents of the area at the address, the internal memory, and he register may be selected as follows. Namely, in place of achieving the output operations when the execution of the application program 9a is stopped, the execution control of the application program 9a may be temporarily stopped at a predetermined timing specified so a to supply, by use of an interruption processing, to the arithmetic and logic unit 3 with the contents of the specified address, the specified internal memory, and the specified register. In this case, the data output section 4 need not necessarily conduct the processing to store output data in the data memory unit 8.

With the configuration above, when a memory address as a read object is supplied from an external device in advance, the data output section 4 reads the content of the data memory 8 or the operation program memory 9. The obtained data content is transmitted via the arithmetic and logic section 3 and the signal input/output unit 2 to the external device. In addition, the conditions associated with the application program 9a, in a range from the start of the program 9a to the termination thereof, can be arbitrarily set and modified in association with the test or debug locations from the external device.

Figure 2:
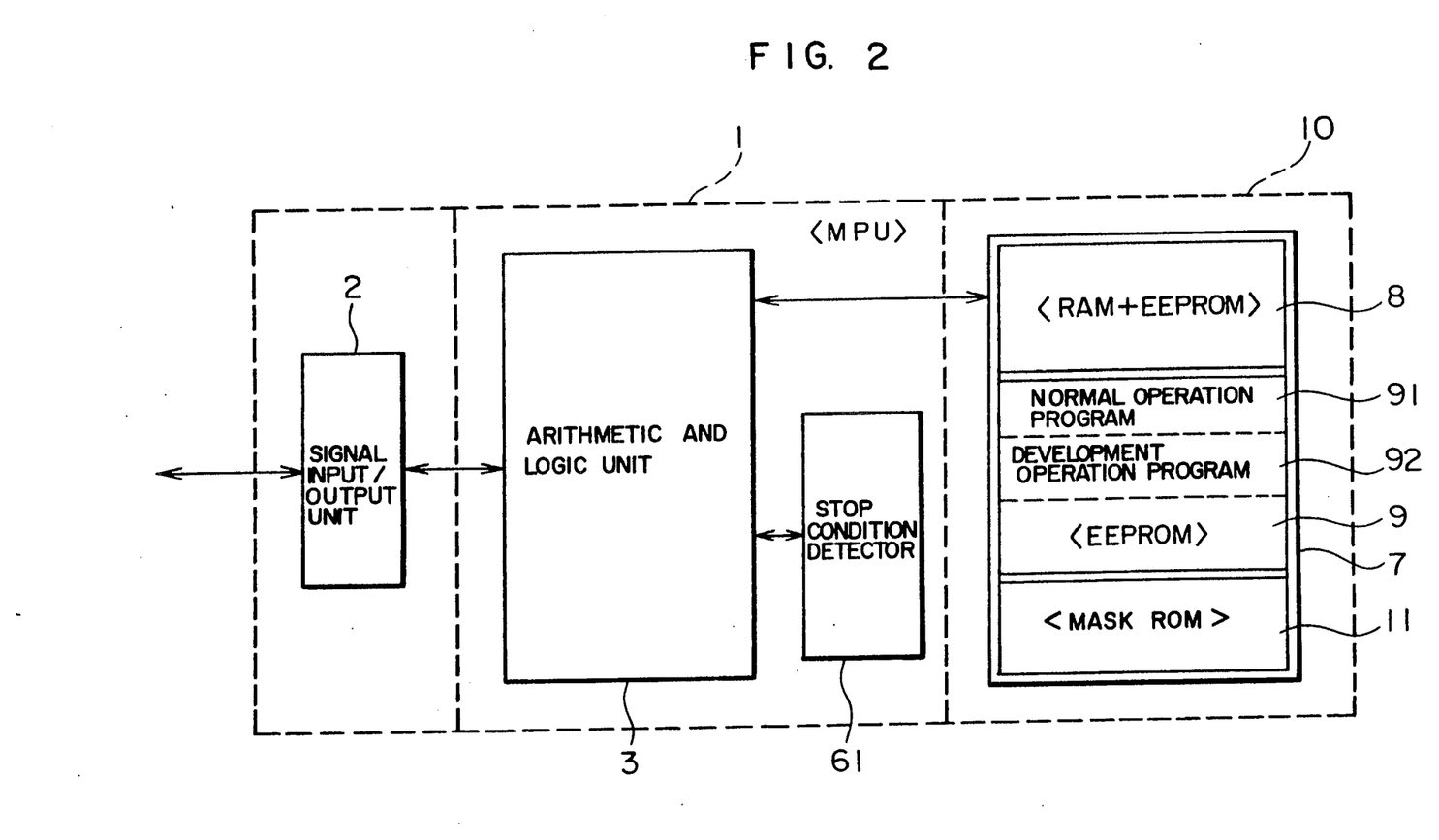
FIG. 2 is a schematic block diagram of an alternative embodiment of an IC card according to the present invention.

FIG. 2 shows an IC card in which in association with the configuration of the MPU of the information processing unit 1, the operations of the data output section 4 and the program initiate section 5 are implemented by a program stored in the operation program memory 9, and the operation of the program stop section 6 is realized by a hardware constitution of a stop condition detector circuit 61 including a program, a comparator, and a register. The programs of the data output section 4, the program initiate section 5, and the program stop section 6 are stored as a development operation program 92 in the operation program memory 9. The application program 9a, as a development object, is similarly stored as an ordinary operation program 91 in a predetermined region of the operation program memory 9.

These two kinds of operation programs operate in respective states, namely, in a development operation mode (associated with the development mode above 9) and an ordinary operation mode. The ordinary operation mode is a state in which the ordinary operation program 91 operates in an environment identical to the actual operation environment. In the development operation mode, the ordinary operation program 91 is controlled by the development operation program 92 such that the initiation and the termination of the ordinary operation program 91 are achieved at an arbitrary address established and that a stop condition can be set from an external device via the development operation program 92.

That is, the development operation program 92 of this example is prepared as a processing program of which various functions such as an execution of the ordinary operation program 91, a termination thereof, an output of the internal state of the program 91, a setting of internal data thereof, and a forcible termination of the program execution, can be specified by supplying particular information items from the external device. The function to set internal information is disposed to arbitrarily set the memory and register contents in the IC card 10 from the external device. The forcible termination function is adopted to forcibly terminate the ordinary operation program 91 when the execution thereof cannot be stopped in an ordinary manner due to an occurrence of a state disabling the program execution control. A signal to finish the execution in this case is supplied from the external device via the signal input/output unit 2 to the arithmetic and logic unit 3. Under the conditions above, owing to the provisions of these functions, the execution and termination of the ordinary operation program 91, the output of the internal state of the program 91, and the setting of the internal information items thereof are repeatedly carried out so as to efficiently achieve the development, the operation test, and the debugging of the application program.

Particularly, a runaway often occurs in a program under development. In consequence, by inputting a forcible termination signal from the signal input/ output unit 2 to interrupt the program operation at a runaway or the like thereof, the program development may be effectively conducted.

Figure 3:
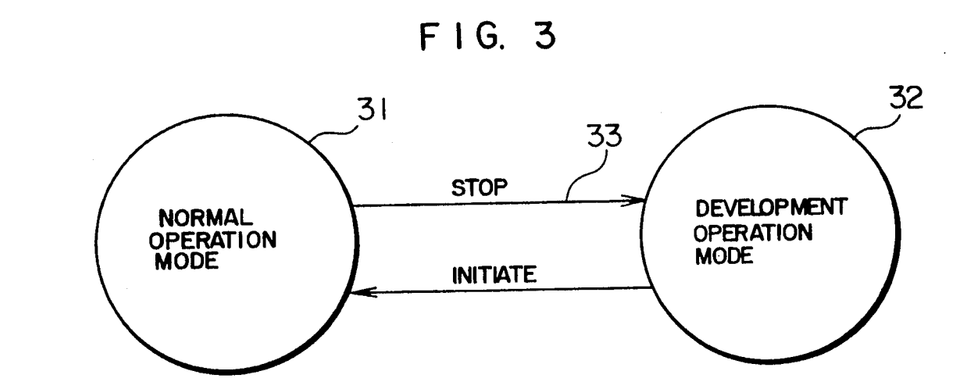
FIG. 3 is an explanatory diagram useful in explaining the transition of the operation state of the IC card.

Switching between the ordinary operation mode and the development operation mode is automatically accomplished without rising the mode switch program, as shown in FIG. 3, by initiating the ordinary operation program 91. That is, when an execution of the ordinary operation program 91 is stopped or when the program 91 is not initiated, the system automatically changes over to the development operation mode. For this purpose, mode identifying information is stored in the RAM area of the data memory 8, so that when the system is powered or immediately after resulting the operation mode is set to the development operation mode. In consequence, the IC card 10 may change over to the state in which the development operation program 92 is initiated.

With the provisions above, during an operation of the ordinary operation program 91, the test can be achieved under an actual operating environment. Incidentally, the mode switch operation may be conversely executed such that when the development operation program 92 is initiated, the development operation mode is automatically set.

As described above, although the embodiments above include the system program memory 11 in addition to the MPU of the information processing unit 1, the memory 11 may be disposed in the MPU. Furthermore, the information memory 7 is arranged outside the MPU; however, the memory 7 may also be located in the MPU. The configurational relationships between the blocks of the information memory 7, the signal input/output unit 2, and the MPU of the embodiments above have been described only by way of example and hence the present invention is not restricted by these embodiments.

Furthermore, the internal constitution of the information memory 7 is not restricted by the configurations of the embodiments. Namely, the constitution may comprise an appropriate combination of various memories including an EEPROM, a RAM, and a ROM. In this case, a memory element may be subdivided into subareas for the control thereof. In addition, as the volatile memory, a RAM as well as a volatile EEPROM may be employed.

While particular embodiments of the invention have been shown and described, it will be obvious to those skilled in the art that various changes and modifications may be made without departing from the spirit and scope present of the invention in its broader aspects.

I claim:

1. An IC card comprising:
   a processor;
   a first memory for storing therein a system program which runs on said processor and which is associated with a basic operation of said IC card;
   a second memory for storing therein an application program which runs on said processor and which corresponds to a usage of said IC card;
   a third memory for storing therein data processed by said processor,
   an input/output unit for effecting input and output operations of programs and data via data communications with an external device;
   program step means for stopping said application program during execution thereof on said processor at any specified address thereof set beforehand via said external device; and
   data output means for supplying said input/output unit with at least one of a content of a register in said processor, a content of said first memory at a specified address, a content of said second memory at a specified address, and a content of said third memory at a specified address when the application program running on said processor is stopped by said program stop means.

2. An IC card according to claim 1, further including means operative in response to mode identifying information including an ordinary operation mode and a development operation mode contained in a mode switch command inputted via said input/output unit of said IC card in order to control an execution of said application program to be executed in said ordinary operation mode for causing said program stop means to operate to stop the execution of said application program on said processor.

3. An IC card according to claim 1, wherein said program stop means includes a register for keeping therein a stop address to be compared with an address signal received from an address bus connected to said processor.

4. An IC card according to claim 1, wherein said program stop means includes means for saving a program code of an address for a stoppage in said application program and for replacing therefor another program code which cannot be executed by said processor.

5. An IC card comprising:
   a processor;
   a first nonvolatile memory section for storing therein a basic processing program of said processor;
   a rewritable second nonvolatile memory section for storing therein an application program associated with said basic processing program;
   a third memory section comprising a rewritable nonvolatile or volatile memory for storing therein various kinds of processing data,
   program initiate processing means for causing said processor to initiate an execution of said application program from any specified address set beforehand via an external device;
   program stop processing means operative during the execution of said application program for stopping the execution when a specified stop condition, set beforehand via said external device to stop execution, is satisfied; and
   data output processing means for supplying said external device with at least one of a content of an internal register of said processor, a content in said second nonvolatile memory section at a specified address and a content in said third memory section at a specified address, the respective specified addressed being set beforehand via said external device, thereby achieving data communications with said external device.

6. An IC card according to claim 5, having an ordinary operation mode and a development mode,
   said ordinary operation mode being disposed to enable said IC card to operate as an ordinary IC card and to enable said application program to be executed;
   said development mode being disposed to enable an execution of said application program to be controlled through operations of said program initiate processing means, said program stop processing means, and said data output processing means,
   either one of said ordinary operation mode and said development mode being selected by said external device.

7. An IC card according to claim 5, wherein said first nonvolatile memory section comprises a mask ROM.

8. An IC card according to claim 5, wherein said second nonvolatile memory section and said third memory section comprise an EEPROM.

9. An IC card according to claim 5, wherein said second nonvolatile memory section and said third memory section are integrated in an EEPROM.

10. An IC card according to claim 6, wherein said program initiate processing means and said data output processing means are included in said processor.

11. An IC card according to claim 6, wherein said first nonvolatile memory section contains a mode switch program effecting a change-over operation between said ordinary operation mode and 12. An IC card according to claim 11, wherein said first nonvolatile memory section comprises a mask ROM.

13. An IC card according to claim 6, further including a debug data storage area to be loaded with debugging data.

* * * * *